United States Patent
Devic et al.

(10) Patent No.: US 6,955,789 B2
(45) Date of Patent: Oct. 18, 2005

(54) COATED LIQUID PHASE REACTOR

(75) Inventors: Michel Devic, Sainte-Foy les Lyon (FR); Philippe Bonnet, Lyons (FR); Eric Lacroix, Amberieux D'Azergues (FR)

(73) Assignee: ARKEMA, Puteaux (FR)

( * ) Notice: Subject to any disclaimer, the term of this patent is extended or adjusted under 35 U.S.C. 154(b) by 3 days.

(21) Appl. No.: 10/503,532

(22) PCT Filed: Jan. 30, 2003

(86) PCT No.: PCT/FR03/00286

§ 371 (c)(1),
(2), (4) Date: Aug. 4, 2004

(87) PCT Pub. No.: WO03/066210

PCT Pub. Date: Aug. 14, 2003

(65) Prior Publication Data

US 2005/0089457 A1 Apr. 28, 2005

(30) Foreign Application Priority Data

Feb. 6, 2002 (FR) .......................... 02 01393

(51) Int. Cl.⁷ .............................. B01B 27/04
(52) U.S. Cl. ................ 422/134; 422/129; 422/131; 422/134; 570/101; 570/123; 570/161; 570/162; 570/165

(58) Field of Search ................. 422/129, 131, 422/134; 570/101, 123, 161, 162, 165

(56) References Cited

U.S. PATENT DOCUMENTS

| | | |
|---|---|---|
| 4,166,536 A | 9/1979 | Roberts et al. |
| 5,902,912 A | 5/1999 | Tung et al. |

FOREIGN PATENT DOCUMENTS

| | | |
|---|---|---|
| EP | 0 294 850 B1 | 6/1988 |
| EP | 0 323 287 B1 | 4/1992 |
| EP | 0 479 657 | 4/1992 |
| EP | 0 532 984 A1 | 9/1992 |

*Primary Examiner*—Samuel Barts
*Assistant Examiner*—Lansana Nyalley
(74) *Attorney, Agent, or Firm*—Steven D. Boyd

(57) ABSTRACT

The present invention relates to a reactor suitable for liquid-phase fluorination and provided, as heating means, with at least one element fixed to the cover so as to be immersed to the bottom of the vessel, characterized in that the parts of said reactor that are liable to be in contact with the reaction medium, other than the heating element, are coated with a tetrafluoroethylene/hexafluoropropylene copolymer and in that the part of the heating element liable to be in contact with the reaction medium is made of silicon carbide.

11 Claims, No Drawings

COATED LIQUID PHASE REACTOR

FIELD OF THE INVENTION

The subject of the present invention is a reactor suitable for the liquid phase fluorination reaction of hydrocarbons, particularly of halogenated hydrocarbons, and more particularly of chlorinated hydrocarbons, and the corresponding fluorination process.

BACKGROUND

The liquid-phase fluorination reaction of halogenated hydrocarbons is one of the means of preparing hydrofluorocarbons (also called HFCs). These compounds are particularly useful as substitutes for chlorofluorocarbons (also called CFCs) or even of hydrochlorofluorocarbons (also denoted by the term HCFCs), the commercialization and utilization of which, especially as refrigeration fluid, has been limited following the Montreal Protocol, because of the risks that the release of these products into the atmosphere harms the stratospheric ozone layer.

HFCs are generally prepared by the action of anhydrous hydrofluoric acid (HF) on a chlorinated hydrocarbon, in the presence of a catalyst, by a substitution reaction in which one or more fluorine atoms replace one or more chlorine atoms. This reaction also produces hydrogen chloride (HCl).

This reaction may be carried out in the gas phase or in the liquid phase. The liquid-phase reaction, which is generally carried out at a temperature between 50 and 150° C., has the advantage of requiring a lower reaction temperature than a gas-phase reaction and consequently has, in general, an improved HFC selectivity.

Patent application U.S. Pat. No. 6,538,165 discloses the use of such a liquid-phase fluorination reaction for the simultaneous preparation of difluoromethane and difluorochloromethane (these compounds also being known as the respective names of HFC-32 and HCFC-22). That document mentions the use of an antimony halide as catalyst and explains the drawback of such a process. This drawback is associated with the corrosion of the material of the reactor by the reaction mixture and especially by the combination of the HF and the antimony halide. Such a drawback, which results in a reduction in the lifetime of the reactor and consumption of the catalyst, is also to be considered within the context of the operational safety of the process, which is an essential aspect in the industrial implementation of an HFC manufacturing process.

Application U.S. Pat. No. 6,538,165 solves this problem by recommending particular temperature and pressure conditions allowing the HF not to be in the liquid state. However, one undesirable consequence of this mode of reaction of the HF is that the desired HFC productivity is appreciably lowered.

The object of international patent application U.S. Pat. No. 5,902,912 is also to limit the corrosion of the reactors used for the liquid-phase fluorination of chlorinated organic compounds. It clearly indicates that the superacid character of the reaction media used has the effect of corroding the materials normally used for manufacturing chemical reactors, including corrosion-resistant materials such as alloys based on nickel and chromium, these being known in the art by the names Inconel® and Hastelloy®. The object of this application is to coat the wall of said reactors with a fluoropolymer. Although this application mentions a number of fluoropolymers that can be envisioned for this purpose, and although it mentions the benefit of preheating the reactants, it does not in any way disclose another means of achieving the heat transfer that is frequently required in a liquid-phase fluorination reaction. It simply suggests the standard use of heat transfer through the walls of the reactor. Now, such a process is not very effective because of the poor heat transmission through a fluoropolymer layer.

SUMMARY OF THE INVENTION

The object of the present application is also to reduce the corrosion of the materials generally used for manufacturing reactors (such as stainless steel). This corrosion is observed when the reaction media required for carrying out liquid-phase fluorination reactions are used. In the trials carried out in order to try to remedy this problem, it was apparent to the inventors that a specific fluorocopolymer, applied in the form of a coating on a stainless steel substrate, exhibited improved corrosion resistance, thus protecting the substrate. Without in any way tying down the applicant, it seems that the mechanism explaining the observed corrosion on stainless steel coated with a fluoropolymer layer is due to the relatively rapid diffusion of Sb(V) ions from the fluorination catalyst through the layer of the said fluoropolymer.

DETAILED DESCRIPTION

It has now been discovered that, by combining this specific fluoropolymer with a particular means of heating the reactor, it is possible to obtain a reactor for carrying out, under excellent selectivity and productivity conditions, liquid-phase fluorination reactions on halogenated, especially chlorinated, hydrocarbons for the purpose of manufacturing HFCs.

The invention therefore firstly relates to a reactor suitable for liquid-phase fluorination and provided, as heating means, with at least one element fixed to the cover so as to be immersed to the bottom of the vessel, characterized in that the parts of said reactor that are liable to be in contact with the reaction medium, other than the heating element, are coated with a tetrafluoroethylene/hexafluoropropylene copolymer and in that the part of the heating element liable to be in contact with the reaction medium is made of silicon carbide.

The tetrafluoroethylene/perfluoropropylene copolymer (the latter compound also being called hexafluoropropylene) is denoted hereafter by the abbreviation TFE-PFP. Advantageously, it makes it possible to limit the diffusion of Sb(V) ions and to thus prevent corrosion of the metal substrate constituting the reactor. The particular arrangement of the heating element and the choice of silicon carbide as material which constitutes the coating thereof (and therefore one that is liable to be in contact with the superacid reaction medium during operation of the reactor) make it possible to maintain excellent corrosion resistance while still providing the heat required by the fluorination reaction, thanks to its advantageous thermal conductivity properties. This combination of characteristics thus avoids the observed drawback when the fluoropolymer is used as coating of a reactor heated—by a jacket or coil—through the polymer-coated wall. This is because in such a case the mechanical strength of the polymer layer is greatly lowered, thereby reducing the impermeability of the protective coating and therefore promoting corrosion of the walls of the reactor.

According to a preferred embodiment, the silicon carbide used to make up the heating element has an α-type crystal structure and contains substantially no free silicon atoms. Under these conditions, the heating element which is in contact with the superacid reaction medium, exhibits really excellent corrosion resistance. The expression "silicon carbide containing substantially no free silicon" should be understood to mean a material whose silicon content, measured by etching (in general by a strong acid) followed by quantitative determination using plasma atomic emission spectroscopy, is less than 0.01% and preferably close to 0%, by weight.

In another embodiment, optionally combined with the previous one, the silicon carbide used has a substantially zero open porosity and consists of crystals whose mean size is between 2 and 10 μm, preferably between 3 and 7 μm and even more preferably close to 5 μm. The term "open porosity" is understood to mean the presence in the material of pores that communicate with one another and with the surface of said material. This open porosity is generally measured by nitrogen adsorption at the temperature of liquid nitrogen.

Preferably, the part of the heating element liable to be in contact with the reaction medium is manufactured by forming the silicon carbide by sintering.

According to another preferred embodiment, the heating element is a hollow cylindrical sheath closed at its lower end, made of silicon carbide. This sheath is generally placed so as to be vertical in the reactor vessel and accommodates, in its hollow part, a heating source such as the circulation of a heat-transfer fluid, or else an electrical resistance element. It is the outer wall of this sheath that is therefore in contact with the reaction medium during operation of the reactor.

The heating element may also include a plate or sheath made of silicon carbide, of various shapes, in which an electrical resistance element has been embedded as heating source.

The heating element may also consist entirely of silicon carbide which, owing to its advantageous resistivity, is suitable for providing heat by resistance heating.

The number of heating elements with which the reactor is equipped is adapted according to the dimensions of the reactor and the required heating power.

Silicon carbide must be used for any part of the heating element liable to be in contact with the reaction medium and with the two liquid or vapor phases that the reaction medium may be in during the fluorination reaction. This reaction medium is a mixture comprising HF, a halogenated, and more particularly a chlorinated, hydrocarbon and an antimony-based catalyst and is at a temperature between 30 and 180° C., preferably between 70 and 150° C., and at a pressure between 5 and 50 bar, preferably between 10 and 40 bar.

The parts of the reactor other than the heating element that are liable to be in contact with the reaction medium comprise in particular:

the vessel, into which the reactants and the catalyst are loaded;

the means for stirring the medium;

the means for introducing the reactants and for discharging the products and by-products (including the pipework and valves);

the measurement means (including the level, temperature and pressure sensors);

the safety means (such as the valves or rupture disks), and the means for separating the catalyst from the vapors resulting from the reaction medium. The latter means comprise, for example, a reflux column which is mounted on the cover of the reactor, is connected on the inside of the vessel and is surmounted by a condenser. The purpose of these means is to keep the fluorination catalyst and the fluorination agent inside the vessel, in the reaction medium, while still allowing removal from the reactor of the desired products, by-products and HCl that are formed.

The tetrafluoroethylene/hexafluoropropylene copolymer coating must cover all the parts of the reactor that are liable to be in contact with the reaction medium. Those parts of the reactor liable to be in contact with the gas phase may also be coated with said copolymer.

The tetrafluoroethylene/hexafluoropropylene copolymer has the general formula

in which n and m are integers greater than 100.

The molar mass of said copolymer is generally between 150 000 and 3 000 000 g.

It is preferred to use a TFE-PFP obtained by polymerization of a monomer mixture comprising from 10 to 15%, and especially about 12%, by weight of perfluoropropene.

In a preferred variant of the invention, the copolymer coating has a thickness of between 10 μm and 2 cm, preferably between 1 mm and 2 cm.

This coating may be produced using known techniques, such as the use of sheets of copolymers, with a thickness of between 1 mm and 2 cm, preferably between 2 mm and 5 mm. These sheets are joined together edge by edge by welding; the coating thus obtained may be floating or properly bonded to the wall of the vessel. It is also possible to deposit, on the walls of the vessel, a continuous film of copolymer with a thickness of between 10 μm and 0.5 mm, for example by hot powder spraying (electrostatic powder coating) or by the use of a fluidized bed, also hot.

The constituent material of the reactor to which the TFE-PFP coating is applied is chosen from conventional materials, known for withstanding corrosion by HF, which include, without being limited thereby, steel, stainless steel, corrosion-resistant grades of INCONEL®, MONEL® and HASTELLOY®. It is preferred to use stainless steel and most particularly 316 L stainless steel.

The present invention also relates to a process for the liquid-phase fluorination of halogenated hydro-carbons, which comprises their reaction with a fluorinating agent in the presence of a catalyst, characterized in that said reaction is carried out in the reactor as described above.

The halogenated hydrocarbons may be linear or cyclic and saturated or unsaturated. It is preferred to use compounds containing 1, 2 or 3 carbon atoms, and more particularly chlorinated hydrocarbons.

This reaction is advantageously used for the preparation of an HFC or an HCFC. Thus, mention may be made of the formation of HFC-32 (with the formula $CH_2F_2$) by fluorination of F30 (methylene chloride, with the formula $CH_2Cl_2$) and/or of F31 ($CH_2FCl$). Mention may also be made of the formation of HFC-134a ($CF_3$—$CH_2F$) or its precursor F133a ($CF_3$—$CH_2Cl$) by fluorination of trichloroethylene, or else the formation of F22 ($CHClF_2$) by fluorination of chloroform. Likewise F122 ($CF_2Cl$—$CHCl_2$), F123 ($CF_3$—$CHCl_2$), F124 ($CF_3$—$CFHCl$) and F125 ($CF_3$—$CHF_2$) may be prepared by fluorination of perchloroethylene or of an intermediate, such as F121 ($CHCl_2$—$CCl_2F$) or F1111 ($CCl_2$=$CClF$)

The fluorinating agent is preferably anhydrous HF, but another fluorinating agent such as $F_2$, $SbF_5$ or $CoF_3$ may also be used.

The liquid-phase fluorination process may be carried out batchwise, semi-continuously or continuously.

When the fluorination is carried out batchwise, the apparatus used is then a closed stirred autoclave into which the reactants have been introduced beforehand, prior to the start of the reaction. The pressure in the autoclave therefore varies with the progress of the reaction.

When the process is carried out semi-continuously, the apparatus used consists of an autoclave surmounted by or else of a simple condenser, or else an assembly consisting of a return column and a reflux condenser. In both cases, a pressure control valve is mounted after the condenser. As previously, the reactants are introduced beforehand, but the low-boiling point reaction products are extracted continuously during the reaction.

When the process is carried out continuously, the same apparatus as that described above is used, but the reactants may be introduced continuously. In this case, the reaction is preferably carried out by continuous feeding of the reactants into a solvent, in which the catalyst has also been dissolved. As solvent, it is possible to choose one of the starting reactants (HF or chlorinated hydrocarbon), or one of the reaction intermediates or else any other solvent capable of dissolving the catalyst.

The fluorination catalyst is a Lewis acid or a mixture of Lewis acids, said acids being especially chosen from metal halides, oxides or oxyhalides. Among suitable metals, mention may be made of: Sn, Sb, Ta, Nb and Ti. When antimony halides (or antimony-containing Lewis acids) in oxidation state V are used, it is advantageous in a continuous process to feed, jointly with the reactants, elemental chlorine $Cl_2$ in an amount (0.005 to 0.25 mol of chlorine per mole of catalyst) sufficient to keep the catalyst in oxidation state V.

It is preferred to use antimony pentachloride as catalyst.

The amount of catalyst used is generally between 0.0005 mol and 0.1 mol per mole of solvent or halogenated hydrocarbon. Preferably, this amount is between 0.001 and 0.05 mol. The amount of hydrogen fluoride fed in (or used batchwise) is generally between 0.5 and 50 mol per mole of chlorinated hydrocarbon fed in (or used batchwise) and preferably between 1 and 10 mol per mole of chlorinated hydrocarbon. In the case of a continuous process, this amount is close to the stoichiometry required by the reaction.

The temperature at which the reaction is carried out is generally between 30 and 180° C., preferably between 70 and 150° C. and even more preferably between 90 and 140° C. The pressure at which the reaction is carried out is chosen so as to maintain the reaction medium in the liquid phase. It is generally between 5 and 50 bar and preferably between 10 and 40 bar. The temperature of the condenser is set according to the amount and nature of the products liable to be discharged during the reaction. It is generally between −50 and 150° C. and preferably between −10 and 100° C.

EXAMPLES

The following examples illustrate the invention without limiting it.

Example 1

Corrosion Resistance of Fluoropolymer-Coated Stainless Steel Plates

Stainless steel plates (length: 9 cm; Width: 5 cm; and thickness: 2 mm) were covered on both their faces with a 2 mm thick sheet made of various fluoropolymers, the assembly being fastened by welding.

The fluoropolymers tested were:

polytetrafluoroethylene (called hereafter PTFE);

a copolymer obtained by polymerization of a monomer mixture comprising, by weight, 2% perfluoropropyl vinyl ether and 98% tetrafluoroethylene (hereafter called PFA); and a copolymer obtained by polymerization of a monomer mixture comprising, by weight, 12% perfluoropropene and 88% tetrafluoroethylene (hereafter called FEP).

The plates thus prepared were placed in a liquid-phase fluorination reactor at a temperature of 100° C. and at an initial pressure of 10 bar, the initially liquid reaction medium of which had the following composition:

| | |
|---|---|
| Anhydrous HF | 80% by weight; |
| $SbCl_5$ | 12% by weight; |
| $CH_2Cl_2$ | 8% by weight. |

The duration of the test was 168 hours.

At the end of the test, the reactor was vented, in order to remove the reaction products, and the plates were washed with water. A sample of the protective coating was then removed and analyzed by electron scanning microscopy.

X-ray microdiffraction analysis on the cross section of the polymer-coated plate was used to measure the diffusion of antimony through the latter.

The results of the test are given in the table below.

| Polymer | Appearance of the polymer | $SbCl_5$ diffusion | Corrosion of the metal plate |
|---|---|---|---|
| PTFE (comparative test) | Substantial deformation | Sb diffusion over 0.2 mm | Yes |
| PFA (comparative test) | No deformation | Sb diffusion over 1.5 mm | Yes |
| FEP | No deformation | No diffusion | No |

These results show that FEP constitutes a completely impermeable barrier to the HF superacid/$SbCl_5$ mixture and exhibits a better capability than PFA and PTFE in respect of producing a coating impermeable to the HF/$SbCl_5$ reaction medium representative of a liquid-phase fluorination reaction.

Example 2

Corrosion Resistance of Sintered Silicon Carbide

A hollow cylindrical test specimen produced by sintering silicon carbide was used, the characteristics of the silicon carbide being the following:

| | |
|---|---|
| Crystal structure: | α-type; |
| Free silicon content: | 0% by weight; |
| Mean crystal size: | 5 μm; |
| Open porosity: | 0% by volume. |

This test specimen was placed in a liquid-phase fluorination reactor at a temperature of 100° C. and at an initial pressure of 10 bar, with a mixture of the following composition:

| | |
|---|---|
| Anhydrous HF | 87% by weight; |
| SbCl$_5$ | 13% by weight. |

The duration of the test was 480 hours.

At the end of the test, the reactor was vented. The test specimen was washed with water and then dried and weighed. After weighing, it was observed that there was no significant weight loss, and visually no trace of corrosion was observed.

This result shows that the material used is perfectly suitable for making heater sheaths for a reaction medium comprising HF/SbCl$_5$.

Example 3

Fluorination of Methylene Chloride (F30) into F32 in an FEP-Coated Reactor

The apparatus used was a 1-liter cylindrical autoclave made of 316L stainless steel, the walls of the autoclave being coated with an FEP sheet (also called a jacket) 3 mm in thickness, in the form of a single cylindrical part closed by a disc at its lower end, and with a diameter slightly less than that of the autoclave, so as to very closely match the shape of the internal walls of the latter.

This autoclave was surmounted by a simple condenser and equipped with a hollow cylindrical sheath produced by sintering silicon carbide, the characteristics of which were identical to those of example 2. Inserted into this sheath, closed at its lower end, was an electrical resistance element coupled to a suitable temperature control means.

The autoclave was then immersed in liquid nitrogen, after which 80 g of HF (4 mol), 85 g of F30 (1 mol) and 90 g of SbCl$_5$ (0.3 mol) were then loaded in succession. Next, the temperature of the autoclave was brought back to room temperature. The temperature of the reaction medium was then raised to 110° C. by means of the electrical resistance element, while the temperature of the condenser was maintained at 20° C. The pressure was set at 20 bar absolute. During the reaction, the continuously removed volatile reaction products (HFC-32 and HCl) passed through a water sparger and then into a dryer before being collected in a liquid-nitrogen-cooled stainless steel trap. After 6 h of reaction, the heating was stopped. After the autoclave returned to room temperature, it was vented and the reaction products were scrubbed, dried and trapped as above. The gas phase and the liquid phase from the various traps, and also the liquid phase possibly remaining in the autoclave after venting, were analyzed.

90% of the initial F30 was converted, comprising 98% F32 and 2% F31 (chlorofluoromethane). After the reaction, the heater sheath showed no degradation on the outside nor on the inside. Moreover, no corrosive attack was observed in the reactor after deposition of the FEP sheet.

Example 4 (Comparative Example)

Fluorination of Methylene Chloride (F30) into F32 in a PTFE-Coated Reactor Heated by a Jacket External to the Vessel Example 3 was repeated except that a 2 mm thick PTFE sleeve was used as inner coating for the 1-liter autoclave and the heating was provided by an external jacket fixed to the vessel of the autoclave, through which jacket hot oil circulated.

After the reaction, the autoclave was opened and it was observed that the PTFE sleeve was deformed in several places and that the inner wall of the vessel was substantially corroded.

Example 5 (Comparative Example)

Fluorination of Methylene Chloride (F30) into F32 in an FEP-Coated Reactor Heated by a Jacket External to the Vessel Example 4 was repeated except that an FEP inner sleeve was used.

It was found that the sleeve had undergone deformations but that the inner wall of the vessel was not corroded. Under industrial operating conditions, the presence of such deformations would result in rapid deterioration of the sleeve, making the reactor unsuitable for use.

What is claimed is:

1. A reactor suitable for liquid-phase fluorination and provided, as heating means, with at least one element fixed to the cover so as to be immersed to the bottom of the vessel, characterized in that the parts of said reactor that are liable to be in contact with the reaction medium, other than the heating element, are coated with a tetrafluoroethylene/hexafluoropropylene copolymer and in that the part of the heating element liable to be in contact with the reaction medium is made of silicon carbide.

2. The reactor as claimed in claim 1, characterized in that the silicon carbide used to make up the heating element has an α-type crystal structure and contains substantially no free silicon atoms.

3. The reactor as claimed in claim 1, characterized in that the silicon carbide used has a substantially zero open porosity and consists of crystals whose mean size is between 2 and 10 μm, preferably between 3 and 7 μm and even more preferably close to 5 μm.

4. The reactor as claimed in claim 1, characterized in that the heating element liable to be in contact with the reaction medium is manufactured by forming the silicon carbide by sintering.

5. The reactor as claimed in claim 1, characterized in that the heating element is a hollow cylindrical sheath closed at its lower end, made of silicon carbide.

6. The reactor as claimed in claim 1, characterized in that parts of the reactor, other than the heating element, that are liable to be in contact with the reaction medium comprise in particular:

a vessel;

a means for stirring the medium;

a means for introducing the reactants and for discharging the products and by-products;

a measurement means;

a safety means, and a means for separating the catalyst from the vapors resulting from the reaction medium.

7. The reactor as claimed in claim 1, characterized in that a tetrafluoroethylene/hexafluoropropylene copolymer obtained by polymerization of a monomer mixture comprising 10 to 15%, preferably about 12%, by weight of hexafluoropropylene is used.

8. The reactor as claimed in claim 1, characterized in that the copolymer coating has a thickness of between 10 μm and 2 μm, preferably between 1 mm and 2μm.

9. A process for the liquid-phase fluorination of halogenated hydrocarbons, which comprises their reaction with a fluorinating agent in the presence of a catalyst, characterized in that said reaction is carried out in a reactor suitable for liquid-phase fluorination and provided, as heating means, with at least one element fixed to the cover so as to be immersed to the bottom of the vessel, characterized in that the parts of said reactor that are liable to be in contact with the reaction medium, other than the heating element, are coated with a tetrafluoroethylene/hexafluoropropylene copolymer and in that the part of the heating element liable to be in contact with the reaction medium is made of silicon carbide.

10. The process as claimed in claim 9, characterized in that chlorinated compounds containing 1, 2 or 3 carbon atoms are made to react.

11. The process as claimed claim 9, characterized in that HFC-32 is prepared by fluorinating F30 and/or F31.

* * * * *

UNITED STATES PATENT AND TRADEMARK OFFICE
CERTIFICATE OF CORRECTION

PATENT NO. : 6,955,789 B2 Page 1 of 1
DATED : October 18, 2005
INVENTOR(S) : Devic et al.

It is certified that error appears in the above-identified patent and that said Letters Patent is hereby corrected as shown below:

Column 8,
Line 67, "$2\mu$" should read -- 2 cm -- both occurrences.

Signed and Sealed this

Tenth Day of January, 2006

JON W. DUDAS
*Director of the United States Patent and Trademark Office*